United States Patent
Heubner et al.

(10) Patent No.: US 11,686,306 B2
(45) Date of Patent: Jun. 27, 2023

(54) LIQUID PUMP, IN PARTICULAR FOR PROVIDING A SUPPLY TO A TRANSMISSION OR TO A CLUTCH IN THE DRIVE TRAIN OF A MOTOR VEHICLE

(71) Applicant: FTE automotive GmbH, Ebern (DE)

(72) Inventors: Wilhelm Heubner, Ebern (DE); Roland Stoessel, Ebern (DE)

(73) Assignee: FTE automotive GmbH, Ebern (DE)

( * ) Notice: Subject to any disclaimer, the term of this patent is extended or adjusted under 35 U.S.C. 154(b) by 117 days.

(21) Appl. No.: 17/106,359

(22) Filed: Nov. 30, 2020

(65) Prior Publication Data
US 2021/0164467 A1 Jun. 3, 2021

(30) Foreign Application Priority Data
Dec. 2, 2019 (DE) ............... 10 2019 132 711.3

(51) Int. Cl.
*F04C 14/04* (2006.01)
*F04C 15/06* (2006.01)
(Continued)

(52) U.S. Cl.
CPC ............ *F04C 2/102* (2013.01); *F04C 13/002* (2013.01); *F04C 14/04* (2013.01); *F04C 29/02* (2013.01); *F16H 57/0436* (2013.01); *F16N 13/20* (2013.01); *F04C 2210/14* (2013.01); *F04C 2240/40* (2013.01); *F16H 57/0473* (2013.01)

(58) Field of Classification Search
CPC .......... F04C 2/102; F04C 14/16; F04C 14/04; F04C 15/06; F04C 28/04; F04C 15/064; F04C 29/12; F04C 29/124
See application file for complete search history.

(56) References Cited

U.S. PATENT DOCUMENTS 3,160,072 A * 12/1964 Martin ................. F03C 2/00
418/133
2010/0322810 A1 12/2010 Schepp et al.
(Continued)

FOREIGN PATENT DOCUMENTS

DE        29 24 222 A1   12/1980
DE        42 06 420 A1    9/1993
(Continued)

OTHER PUBLICATIONS

German Search Report dated Sep. 3, 2020 in German Application 10 2019 132 711.3 filed Dec. 2, 2019 (with English Translation of Categories of Cited Documents & Written Opinion), 6 pages.
(Continued)

*Primary Examiner* — Deming Wan
(74) *Attorney, Agent, or Firm* — Oblon, McClelland, Maier & Neustadt, L.L.P.

(57) ABSTRACT

A liquid pump, in particular for providing a supply to a transmission or to a clutch in the drive train of a motor vehicle, includes a drive motor, a pump module which can be operated in two opposing directions of rotation, and at least one inlet and multiple outlets, each of which has at least one corresponding check valve. The pump has a valve plate corresponding to the pump module in which, for each check valve, a valve seat and a receptacle for a valve element interacting with the valve seat are provided.

10 Claims, 6 Drawing Sheets

(51) Int. Cl.
    *F04C 29/12*     (2006.01)
    *F04C 14/06*     (2006.01)
    *F04C 2/10*     (2006.01)
    *F04C 28/04*     (2006.01)
    *F16C 3/22*     (2006.01)
    *F04C 13/00*     (2006.01)
    *F04C 29/02*     (2006.01)
    *F16H 57/04*     (2010.01)
    *F16N 13/20*     (2006.01)

(56) References Cited

U.S. PATENT DOCUMENTS

2013/0121854 A1* 5/2013 Thiel .................... F04B 9/02
    417/313
2013/0177451 A1* 7/2013 Haig .................... F04B 53/10
    417/53
2014/0234124 A1 8/2014 Rühle et al.
2015/0078930 A1 3/2015 Kakino et al.
2015/0086405 A1 3/2015 Konakawa et al.
2016/0327157 A1* 11/2016 Herkommer ............ F16D 25/12

FOREIGN PATENT DOCUMENTS

| | | |
|---|---|---|
| DE | 199 20 289 C1 | 7/2000 |
| DE | 697 23 144 T2 | 4/2004 |
| DE | 10 2014 111 133 A1 | 2/2016 |
| EP | 1 461 533 A1 | 9/2004 |
| EP | 1 555 469 A1 | 7/2005 |
| WO | WO 03/056180 A1 | 7/2003 |

OTHER PUBLICATIONS

Extended European Search Report dated May 14, 2021 in European Patent Application No. 20210099.6, 8 pages.

* cited by examiner

LIQUID PUMP, IN PARTICULAR FOR PROVIDING A SUPPLY TO A TRANSMISSION OR TO A CLUTCH IN THE DRIVE TRAIN OF A MOTOR VEHICLE

The invention relates to a liquid pump, in particular for providing a supply to a transmission or to a clutch in the drive train of a motor vehicle, having a drive motor, having a pump module which can be operated in two opposing directions of rotation, and having an inlet and multiple outlets, each of which is assigned at least one check valve.

A liquid pump of said type serves for supplying a lubricant, that is to say oil, to lubrication points in the transmission and/or clutch discs in a desired manner.

The possibility of operating the liquid pump in two opposing directions of rotation allows different outlets of the liquid pump to be provided with a supply in a different manner. For example, an outlet leading to a clutch may be provided, during operation in a first direction of rotation, with only a small lubricant stream ("minimum-quantity lubrication"), which leads for example to low drag losses with an open clutch, but, during operation in the opposite direction of rotation, with a larger lubricant stream.

The object of the invention is to provide a liquid pump which is characterized by a highly compact construction and which can nevertheless be produced with low costs.

For the purpose of achieving said object, it is provided, in the case of a liquid pump of the type mentioned in the introduction, that the pump module is assigned a valve plate in which, for each check valve, a valve seat and a receptacle for a valve element interacting with the valve seat are provided. The invention is based on the fundamental concept of assembling in one component, specifically the valve plate, the different check valves which make it possible, during operation in the opposing directions of rotation, for the desired oil stream to be delivered in each case. This makes it possible for all the check valves to be attached to the liquid pump so as to be directly integrated.

Preferably, each valve seat forms together with the assigned receptacle a throughflow channel which is arranged substantially in an axial direction. "An axial direction" means here a direction which is parallel to the drive shaft of the pump module. It is preferably also parallel to the outflow direction of the oil from the pump module. The particular advantage of axially oriented throughflow channels is that the valve plate may be manufactured in an undercut-free manner, for example by a casting process or by machining, without complicated transverse bores having to be present.

In the valve plate, there may be provided at least one flow transfer opening which extends from one throughflow channel to another throughflow channel and which is exposed at one of the flat sides of the valve plate. Such a flow transfer opening can be produced with little outlay and provide additional functionalities.

If the flow transfer opening is in the form of a throttle, it is possible for example to ensure a lubricant stream which is independent of the direction of rotation of the liquid pump.

It may be provided that the pump module has a pump plate, wherein the valve plate is arranged on the pump plate, and the pump plate has at least one flow transfer channel which connects two throughflow channels to one another. It is also possible with the flow transfer channel for additional functionalities or oil streams to be provided without complicated geometrical shapes of the valve plate being required for this purpose.

According to a preferred embodiment, a closure plate is arranged on that side of the valve plate facing away from the pump module and is provided with at least one inlet opening and at least two outlet openings. With the closure plate, the result is a particularly compact design in which the valve plate can be clamped between the closure plate and the pump module.

Proceeding from the closure plate, at least two cooling media channels may extend through the valve plate and the pump module to the drive motor. By means of the cooling media channels, a part of the lubricant stream can be branched off and guided through the drive motor in order to cool the latter.

Here, a throttle may be provided for at least one of the cooling media channels in the valve plate, so as to set the throughflow to a desired value.

According to one configuration of the invention, it is provided that the valve elements have a central body and multiple outer, axially extending guide wings.

With the guide wings, it is possible to ensure an adequate flow cross section between the walls of the receptacle and the central body, while at the same time the guide wings are able to limit the maximum adjustment distance of the valve elements in the opening direction.

According to one embodiment of the invention, it is provided that the valve elements are without a restoring spring. It has been found that restoring springs can be dispensed with, since the valve elements reliably close under the action of the pressure drop over the valve element and provide sufficient sealing by way of the prevailing pressure difference.

The invention will be described below on the basis of an embodiment which is illustrated in the appended drawings. In these drawings.

Figure 1:
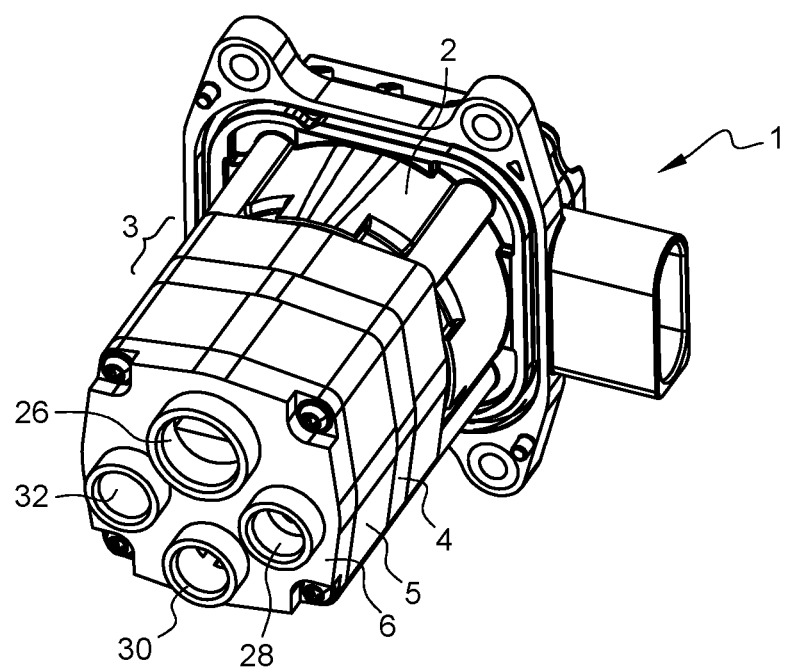
FIG. 1 shows a liquid pump according to the invention in a perspective view.
Figure 3:
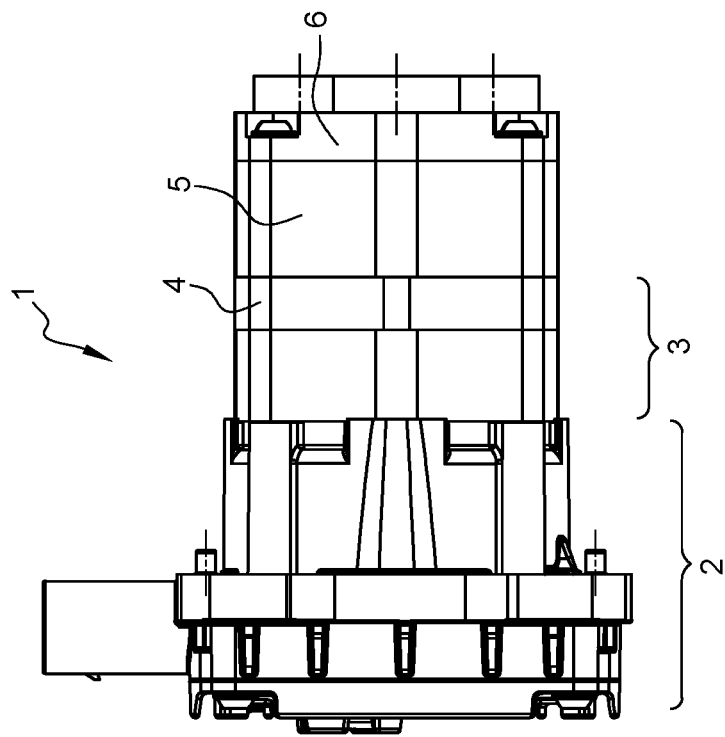
FIG. 3 shows a side view of the liquid pump in FIG. 2.
Figure 2:
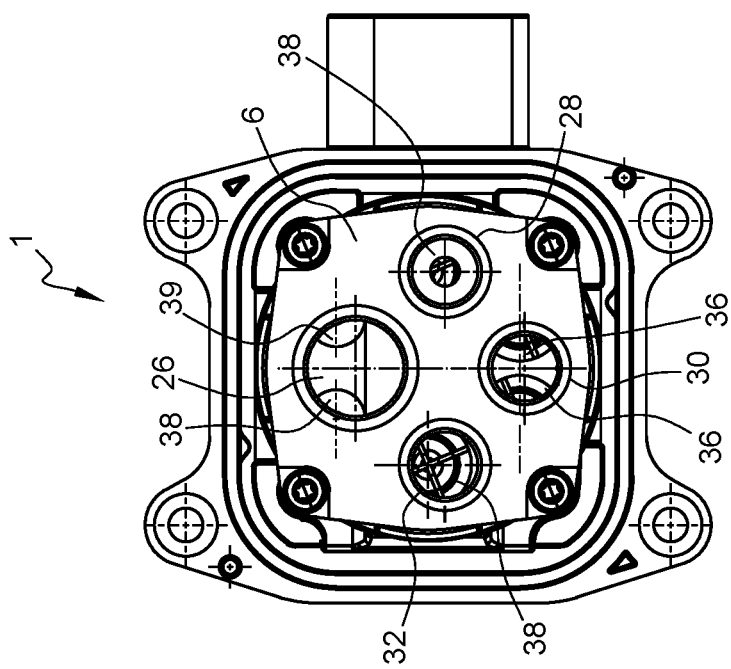
FIG. 2 shows a view from below of the liquid pump in FIG. 1.

The figures show a liquid pump 1, which has, as main constituent parts, a drive motor 2, a pump module 3, a pump plate 4, a valve plate 5 and a closure plate 6 (see in particular FIGS. 1 to 4).

The drive motor 2 is an electric motor having a motor housing 10, a stator 12 and a rotor 14 which drives a pump rotor 18 of the pump module 3 via a rotor shaft 16. The pump rotor 18 is part of a toothed ring pump, which has an outer ring 20 in which the pump rotor 18 meshes. The outer ring 20 glides in a pump housing 22. This pump type is also known as a "gerotor pump".

The openings which lead to the pump space, which is delimited between the pump rotor 18 and the outer ring 20, are provided in the pump plate 4. Merely two cutouts 24 can be seen in FIG. 4.

A flow transfer channel 25 is provided in the pump plate 4 and serves for returning to the intake region leakage oil of the pump that can escape via the bearing arrangement of the drive shaft. At the same time, the bore can serve for weight reduction or for avoiding mass accumulations, which can be obstructive in some production processes.

The pump module 3 can be operated in opposing directions of rotation, so that the inlets and outlets have different functions according to direction of rotation; the opening, or the slot, which constitutes the suction side of the pump in one direction of rotation, is the pressure side in the opposite direction of rotation.

In the closure plate 6, there are provided for the liquid pump 1 an inlet opening 26, as an inlet, and three outlet openings 28, 30, 32, which serve as pressure outlets of the liquid pump 1, as outlets.

A total of six check valves, which are formed in the valve plate 5, serve for the "switching" of the various fluid streams for different directions of rotation of the pump module 3.

Each check valve is formed by a valve seat 34 with which in each case one valve element 36, 38, 39 interacts. Each valve element 36, 38, 39 is arranged in a receptacle 40, which is likewise formed in the valve plate 5.

Each of the valve elements 36, 38, 39 has a body 42 and multiple axially extending guide wings 44. The guide wings are supported against the walls of the respective receptacle 40 and define between the wall of the receptacle 40 and the outer surface of the body 42 a throughflow channel.

Figure 6:
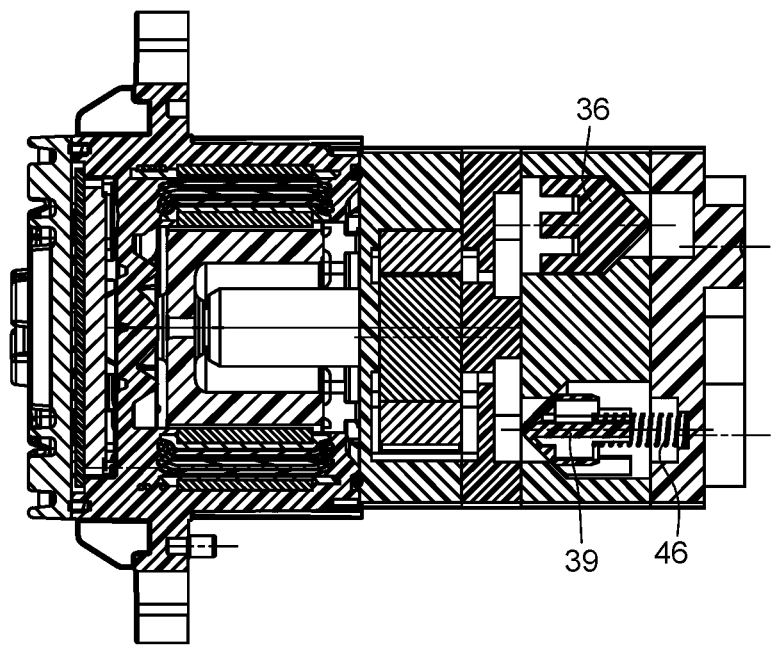
FIG. 6 shows a longitudinal cross section through the liquid pump.

Wherever one of the check valves is also to have the function of a pressure-limiting valve, it is assigned a restoring spring (see the restoring spring 46 for the valve element 39 in FIG. 6).

Figure 5:
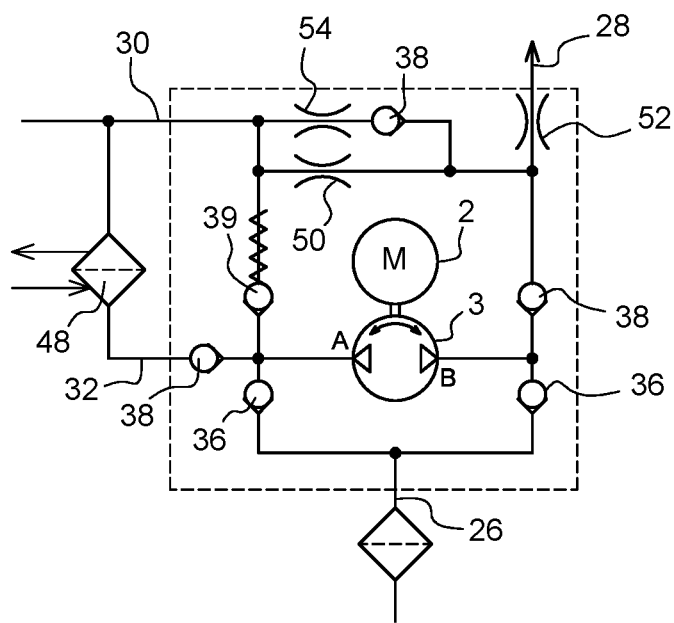
FIG. 5 shows a hydraulic flow diagram for the liquid pump.

The functioning of the liquid pump will be explained below on the basis of FIG. 5. For reasons of better clarity, the corresponding check valve is denoted below by the reference sign of "its" valve element.

If the liquid pump is operated in a first direction of rotation (assumed to be anticlockwise in this case), the opening B constitutes the suction side of the pump module 3. The liquid pump 3 sucks in via the check valve 36 on the right in FIG. 5 and the inlet opening 26 of the closure plate 6. Here, the liquid pump 1 may be fitted on a transmission housing such that it sucks in directly from the transmission. Alternatively, it may suck in from a separate storage container.

The oil is delivered via the outlet opening A and is then guided through one of the check valves 38 to the outlet opening 32, where an oil cooler 48 (illustrated schematically) is provided with a supply. If the throughflow resistance in the oil cooler is too high (for example in the case of a very low oil temperature), the check valve 39, which constitutes a pressure-limiting valve on account of the spring preload, opens.

The oil stream through the pressure-limiting valve 39 then flows to the outlet opening 30 and via a throttle 50 and a further throttle 52 to the outlet opening 28. The outlet opening 28 may lead to one or more clutches and ensure in particular minimum-quantity lubrication there.

The outlet opening 30, which leads to lubrication points in the transmission, is furthermore provided with a supply.

If the liquid pump is operated in the opposite direction (clockwise then in this case), the opening A constitutes the suction side of the pump module 3. The liquid pump 3 sucks in via the check valve 36 on the left in FIG. 5 and the inlet opening 26 of the closure plate 6. The oil flows from the suction side of the pump module 3 through the check valve 38 and the throttle 52 to the outlet opening 28. Part of the oil furthermore flows through the throttle 50 to the outlet opening 28. Parallel thereto, there may flow a further oil stream through the check valve 38 and a further throttle 54 to the outlet opening 30.

A particular feature of the check valves is that, overall, they (at least substantially) extend in an axial direction, that is to say the receptacles and the flow cross sections formed by the valve seats define an oil stream in a direction which is parallel to the longitudinal axis of the pump and also to the direction of extent of the rotor shaft 16. This also has advantages during the assembly, since all the parts are able to be assembled in an axial direction.

Figure 4:
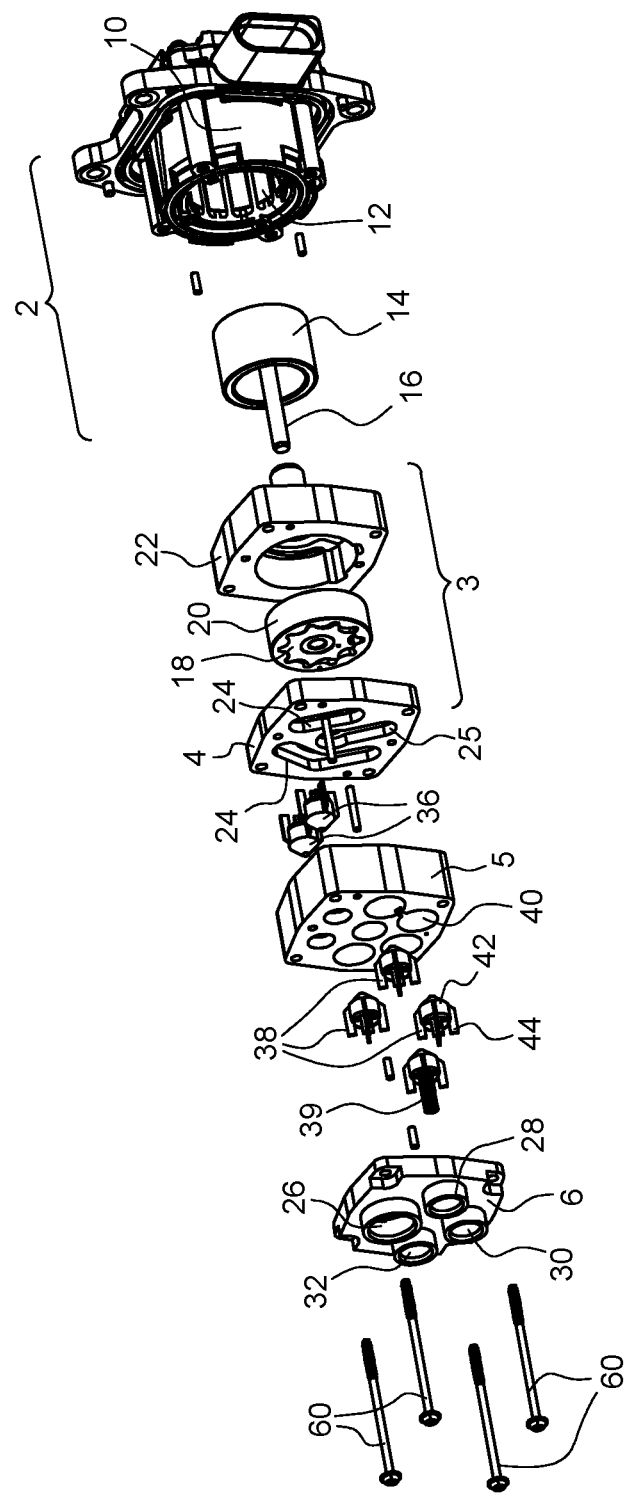
FIG. 4 shows a perspective exploded view of the liquid pump.

As can be seen in FIG. 4, use may be made of assembly screws 60, by way of which the closure plate 6, the valve plate 5, the pump plate 4 and the pump housing 22 can be screwed to the motor housing 10 in an axial direction. In the process, the valve elements 36, 38, 39 of the check valves are also suitably fixed in the valve plate 5, specifically between the corresponding valve seat and the pump plate (check valves 36) or the corresponding valve seat in the valve plate 5 and the closure plate 6 (check valves 38, 39).

Figure 7:
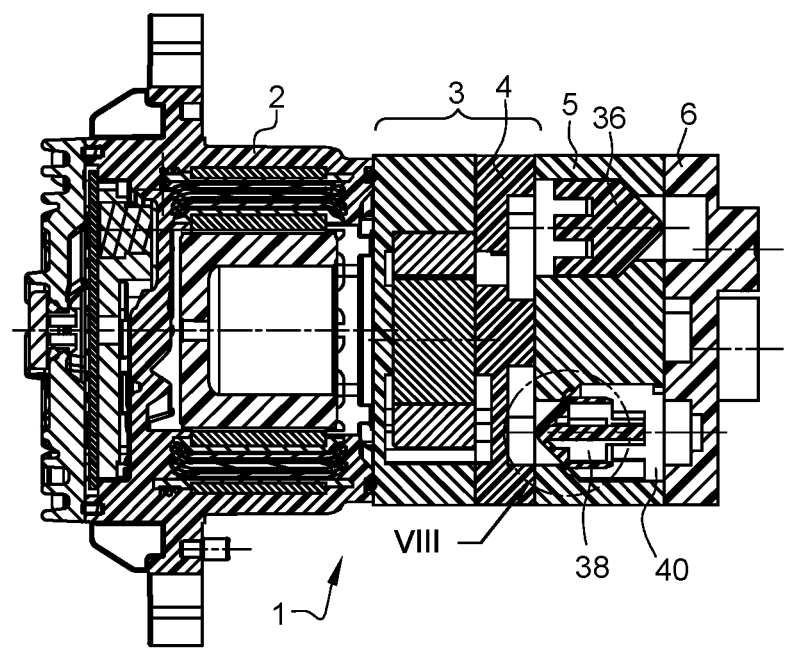
FIG. 7 shows a further longitudinal cross section through the liquid pump.
Figure 9:
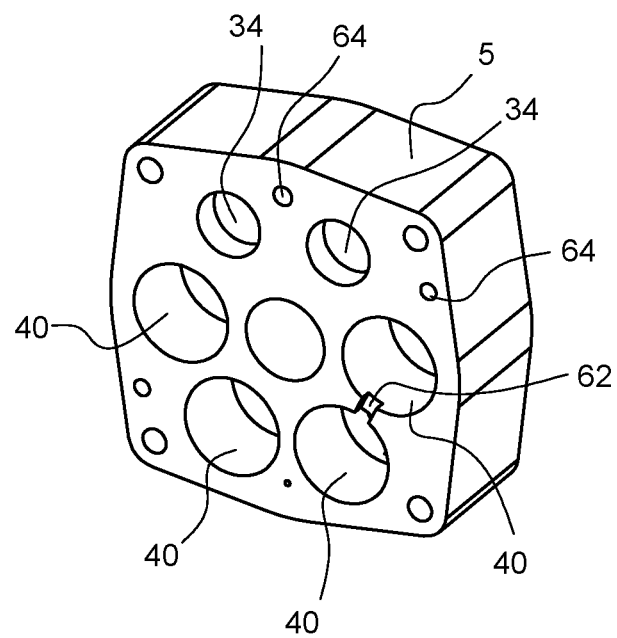
FIG. 9 shows the valve plate used in the liquid pump in a perspective view.
Figure 10:
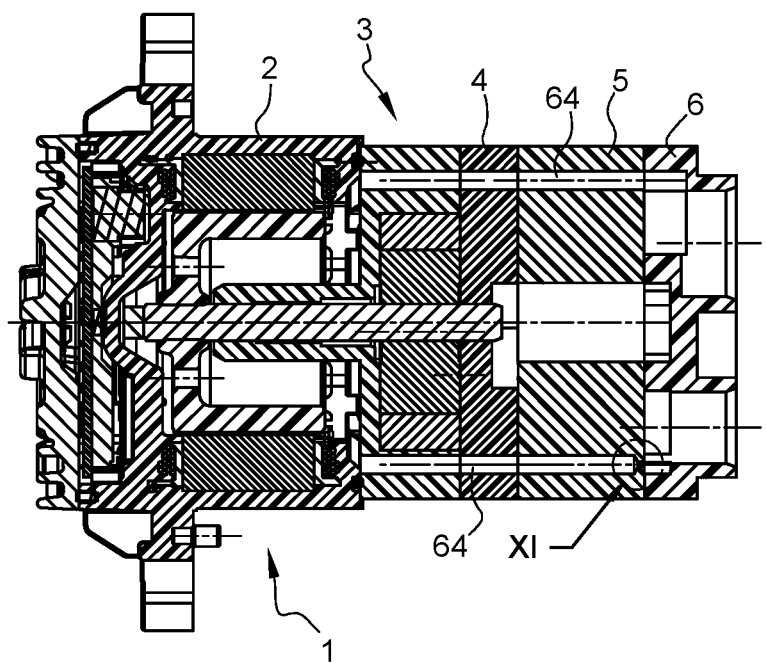
FIG. 10 shows a further longitudinal section through the liquid pump.

On account of the axial arrangement of the check valves, the valve plate 5 may be designed in an undercut-free manner (see for example FIGS. 6, 7 and 9). The valve plate 5 may be produced by a casting process, with no slides being necessary, or it may be produced by machining of a material block. No concealed transverse bores are required.

Figure 8:
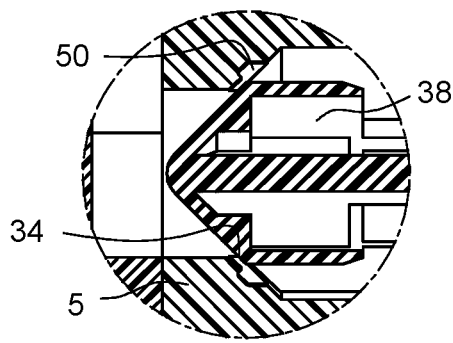
FIG. 8 shows the detail VIII in FIG. 7 on an enlarged scale.

It can be seen in FIG. 8 that the throttle 50 can be integrated into a check valve (the check valve 38 in this case), specifically in that a groove is provided in the valve seat. This ensures a particular minimum throughput without the check valve 38 having to be open.

As can be seen in FIG. 9, the connection between the outlet openings 28, 30 may be formed by a flow transfer opening 62 which is formed between two receptacles in the valve plate. The flow transfer volume can be set in the desired manner by way of the cross section.

Proceeding from the closure plate 6, there are provided two cooling media channels 64 which extend through the valve plate 5 and the pump module 3 to the drive motor 2. The cooling media channels 64 serve for branching off a part of the oil stream and for guiding said part through the drive motor 2, so that the latter is cooled.

Figure 11:
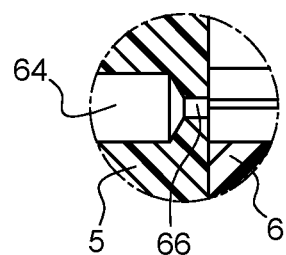
FIG. 11 shows the detail XI in FIG. 1 on an enlarged scale.

The flow through the cooling media channels can be set in the desired manner by way of a throttle point 66 in the valve plate (see FIG. 11).

The invention claimed is:

1. A liquid pump, comprising:
   a drive motor;
   a pump module configured to be operated in two opposing directions of rotation, an inlet opening and multiple outlet openings, each of the outlet openings has at least one corresponding check valve; and
   a valve plate provided corresponding to the pump module in which, for each of the check valve,
   a valve seat and a receptacle throughflow channel for the respective valve element interacting with the valve seat are provided, wherein
   each of the valve seat forms together with the corresponding receptacle throughflow channel which is arranged substantially in an axial direction of a drive shaft of the pump.

2. The liquid pump according to claim 1, wherein,
   the valve plate comprises at least one flow transfer opening which extends from one of the throughflow channel to the other throughflow channel and which is exposed at one of flat sides of the valve plate.

3. The liquid pump according to claim 2, wherein the at least one flow transfer opening forms a throttle.

4. The liquid pump according to claim 1, wherein each of the valve elements has a central body and multiple outer, axially extending guide wings.

5. The liquid pump according to claim 1, wherein the valve elements are without a restoring spring.

6. The liquid pump according to claim 1, wherein the liquid pump is configured to supply at least one of a transmission and a clutch in a drive train of a motor vehicle.

7. A liquid pump, comprising:
a drive motor;
a pump module configured to be operated in two opposing directions of rotation, an inlet opening and multiple outlet openings, each of the outlet openings has at least one corresponding check valve, and
a valve plate provided corresponding to the pump module in which, for each of the check valve,
a valve seat and a receptacle throughflow channel for the respective valve element interacting with the valve seat are provided, wherein
the pump module has a pump plate,
the valve plate is arranged on the pump plate, and
the pump plate has at least one flow transfer channel which connects two of the throughflow channels to one another.

8. A liquid pump, comprising:
a drive motor;
a pump module configured to be operated in two opposing directions of rotation, an inlet opening and multiple outlet openings, each of the outlet openings has at least one corresponding check valve, and
a valve plate provided corresponding to the pump module in which, for each of the check valve,
a valve seat and a receptacle throughflow channel for the respective valve element interacting with the valve seat are provided, wherein
a closure plate is arranged on a side of the valve plate facing away from the pump module and is provided with at least one said inlet opening and at least two said outlet openings.

9. The liquid pump according to claim 8, comprising at least two cooling media channels extending from the closure plate through the valve plate and the pump module to the drive motor.

10. The liquid pump according to claim 9, wherein a throttle is provided for at least one of the at least two cooling media channels in the valve plate.

* * * * *